June 3, 1924.
C. F. RAUEN
1,496,740
AUTOMATIC BRAKE FOR POWER TRANSMISSION SYSTEMS
Filed May 29, 1923
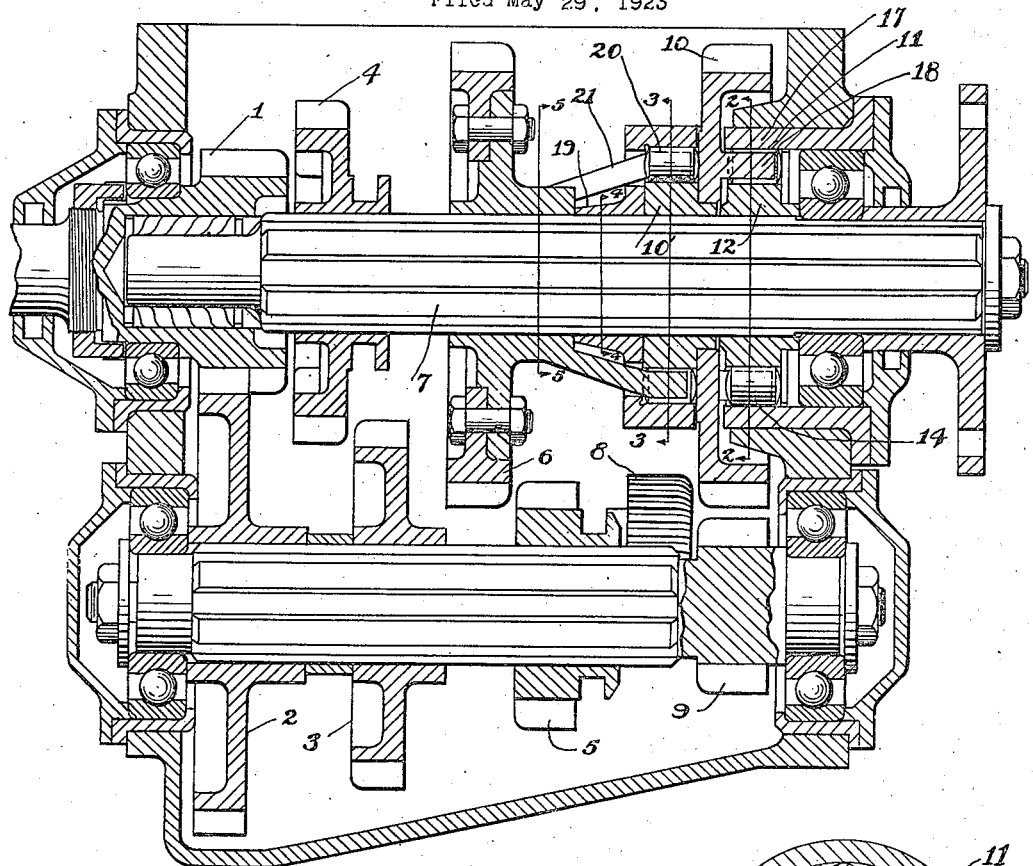
Fig. 1
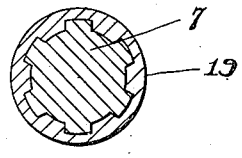
Fig. 4.
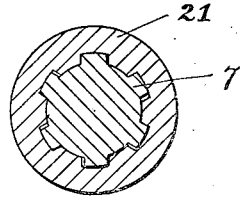
Fig. 5.
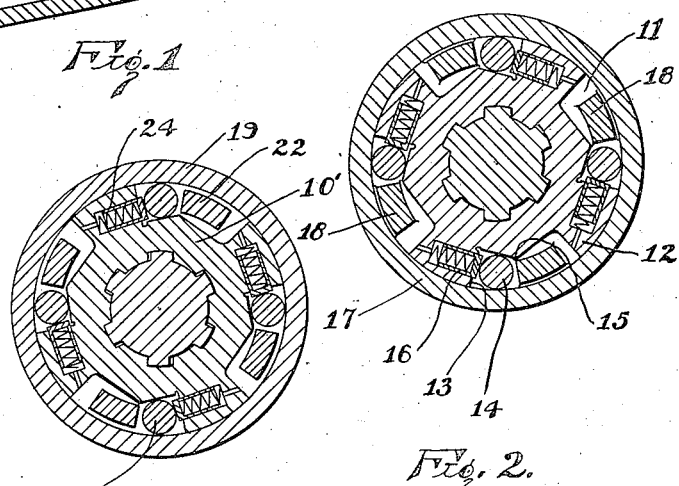
Fig. 3.
Fig. 2.
INVENTOR
Carl F. Rauen
BY
ATTORNEY Patented June 3, 1924.

1,496,740

UNITED STATES PATENT OFFICE.

CARL F. RAUEN, OF DAYTON, OHIO.

AUTOMATIC BRAKE FOR POWER-TRANSMISSION SYSTEMS.

Application filed May 29, 1923. Serial No. 642,302.

REISSUED

*To all whom it may concern:*

Be it known that I, CARL F. RAUEN, a citizen of the United States, residing at Dayton, in the county of Montgomery and State of Ohio, have invented certain new and useful Improvements in Automatic Brakes for Power-Transmission Systems, of which the following is a specification.

This invention relates to power transmission systems and is especially adaptable to motor vehicles. When applied to motor vehicles its function is to prevent any down hill movement of the vehicle in a reversed direction. The automatic brake is released automatically in my device by the source of power itself when this source of power is applied to drive the vehicle in a forward direction. An automatic brake or clutch, as applied in my invention, will eliminate the necessity of using the foot or hand brakes to hold the car till the engine is clutched to the drive wheels and greatly facilitates starting the car up an incline.

Further objects will be more fully set forth in the attached specification and claims.

In the drawings;

Fig. 1 is a vertical section through a transmission gear box of an automobile showing the adaptation of my invention.

Fig. 2 is a vertical section on the line 2—2 of Fig. 1.

Fig. 3 is a vertical section on the line 3—3 of Fig. 1.

Fig. 4 is a vertical section on the line 4—4 of Fig. 1.

Fig. 5 is a vertical section on the line 5—5 of Fig. 1.

Referring to the drawings by reference numerals, 1 is the stem gear of an automobile transmission and is suitably connected to the engine or source of power, 2 is the countershaft drive gear which engages the gear 1 at all times, 3 is a second speed countershaft gear which engages with the second and third sliding gear 4, 5 is a countershaft low speed gear and is slidably splined to the countershaft and meshes with the low speed gear 6 which is splined on the shaft 7 to which is also splined the second speed gear 4. 8 is the reverse idler gear which is slidably mounted on its shaft and meshes with the countershaft reverse gear 9 and the propeller shaft reverse gear 10. The shaft 7 is suitably connected to the drive wheels of the vehicle in the customary manner, 11 is an automatic brake or over-running clutch and consists of a cam member 12 which is fixed or tightly splined to the propeller shaft 7, and which is provided with cut-away portions 13 more clearly shown in Fig. 2, in each of which is a roller 14. These rollers are adapted to be pressed by springs 16 so as to be urged by these springs away from their positions in the end of the cut-away portions. These cutaway portions 13 are suitably tapered, the distance between the point 15 of this cut-away portion and the fixed outer shell or race 17 being smaller than the diameter of the rollers. It will be seen, therefore, that the springs and rollers will prevent a clockwise movement of the countershaft 7 as the rollers will wedge between parts 17 and 12. The arrangement will, however, permit a counter-clockwise rotation of the shaft as there is no wedge action to lock the parts 12 and 17 together.

The reverse gear 10 is rigidly connected to a member 10' which is loosely splined on the shaft 7 as shown in Fig. 3, and the gear 10 is provided with axial projections or lugs 18 which project into the cutaway portions 13 of the automatic clutch arrangement 11 so as each lug is closely adjacent to one of the rollers 13. The looseness of the spline between the part 10' and the shaft 7 permits a relative rotation of the gear wheel 10 and the rollers 14 so that these rollers may be rotated clockwise (see Fig. 2) to press against the tension of the springs 16, forcing the roller 14 into the large portions of the cut-away parts 13 and preventing them from locking the parts 12 and 17 together.

The part 10' of the gear wheel 10 has similar cut-away portions therein with corresponding rollers and springs in the same manner as the automatic over-running clutch 11, and the shell part or race 19 is rigidly connected as shown in Fig. 4 to the shaft 7. A second automatic over-running clutch or brake 20 is thus provided by the shell part 19 and the cam part 10', but which operates in a reverse direction from the over-running clutch 11. The gear 6 is provided with arms 21 integrally connected thereto, the ends of which form releasing dogs 22 which may release the rollers of the clutch 20 when the gear 6 is rotated relatively to the automatic brake 20. This rotation is permitted by a loose spline as shown in Fig. 5 between the gear 6 and the shaft 7.

It will be seen that the automatic brake 11 will operate to prevent a reverse rotation of the propeller shaft due to the car drifting backwards since at such times the lugs 18 are not forced against the rollers 14 to prevent them from locking, the lugs 18 merely rotating around freely with the shaft 7 when the car is out of gear or in high, second or low gear.

When the car is in reverse gear and the countershaft and reverse idler 8 driving the gear 10 in a clockwise direction, (see Figs. 2 and 3) the lugs 18 fastened to this gear 10 will be forced against the rollers 14 to release them from their wedged position and so release the shaft 7 and permit the car to be driven backwards by the gear 10. The looseness of the spline between the gear 10 and the shaft 7 operably connects these two members after the rollers are released and the loose play in the spline taken up. As soon as the speed of the engine is decreased by the operator or after the clutch between the engine and the transmission mechanism is released with the car in reverse gear, the gear 10 would not continue to hold the brake 11 released as the lugs 18 would drift away from the rollers 14 and the car would immediately stop with a jerk, and backwards coasting in reverse gear prevented, if it were not for the second clutch arrangement 20. This clutch or brake 20 functions to lock the reverse gear 10 and its lug 18 in such a position as to hold the rollers 14 of the brake 11 from wedging. This is accomplished by means of the rollers 23 which prevent any counter-clockwise movement of the gear 10 and its integral part 10' at this time by the wedging action of the same between parts 10' and 19 locking the gear 10 to the shaft 7, the lugs 22 of the gear 6 not exerting any force on the rollers as the gear 6 is free to rotate with the shaft 7. The springs 24 of the clutch 20 will ordinarily be sufficient to prevent any inertia or other effect, as for instance the effect of the dragging of the oil on the gear 6 which might tend to release the rollers 23 at this time; but if desired a spring may be added to connect gear 6 to the race 19 of the brake 20 so as to normally urge the gear 6, which is loosely splined on shaft 7, in a clockwise direction (see Fig. 3) in relation to the race 19.

When the car has stopped its backwards coasting in reverse gear, and it is again desired to go forward, the reverse idler gear 8 is disengaged by moving it to its position as shown in Fig. 1, and the gear 5 operated to engage the first speed gear 6. Then when the engine power is applied to the gear 6 it will be rotated counter-clockwise to first release the rollers of the brake 20 which immediately release the gear 10 and lugs 18 of brake 11 and permit the rollers 14 to operate to arrest reverse or backwards movement of the shaft 7 arresting any backwards movement of the car. The gear 6 will then operate to drive the shaft 7 after the loose play in the spline connection of this gear has been taken up.

It is understood that the lugs 22 can be operated by any of the forward drive gears if this construction is desired. Although I have shown my invention as applied to a gear box of an automobile I am aware that my invention is capable of adaption in any power transmission system.

I claim,

1. In a change speed gear box for the transmission of power having a shaft adapted to be rotated in either direction for the transmission of power, a mechanism connected to such shaft to automatically arrest movement of said shaft in one direction, a device for rendering said mechanism inoperative, and means operably connected to the transmission mechanism to be operated thereby to operate the said device when the said shaft is driven by power in the other direction.

2. In a change speed gear box for power transmission, a shaft adapted to be driven by a source of power, change speed gearing between said source and shaft, a mechanism connected to such shaft to normally and automatically arrest movement of said shaft in one direction, a device for rendering said mechanism inoperative, and means operably connected to the change speed gearing to be operated thereby to operate the said device when said shaft is driven by the source of power in the other direction.

3. In a change speed gear box of a motor vehicle, a shaft to be driven by a motor, change speed gearing between said motor and shaft, a mechanism connected to said shaft to normally automatically arrest movement of said shaft in one direction, and a device for rendering said mechanism inoperative, said device being directly connected to and operated by one of the gears of the change speed gearing when the said gear is driven by the motor.

4. In the change speed gear box for power transmission, a driving shaft, a driven shaft, change speed gears on said shafts to interconnect the same, a mechanism connected to said driving shaft to normally automatically arrest rotation of said driven shaft in one direction, a device for rendering said mechanism inoperative, and a means to operate said device automatically when a gear on the driven shaft is driven from the driving shaft.

5. The construction as set forth in claim 4, together with means for maintaining said device inoperative after the said gear on the driven shaft ceases to be driven from the driving shaft.

6. The construction as set forth in claim 4, together with means for maintaining said device inoperative after the said gear on the driven shaft ceases to be driven from the driving shaft, and a mechanism for automatically releasing said last mentioned means with a second gear on the driven shaft is driven from the driving shaft.

7. In a change speed gear box of a motor vehicle, a driving shaft, a driven shaft, change speed gears on said shafts to interconnect the same for reverse and forward drive of the driven shaft, a mechanism connected to said driven shaft to normally automatically arrest reverse rotation of said driven shaft, a device for automatically rendering said mechanism inoperative when the driven shaft is reversely rotated by the driving shaft, means for maintaining said mechanism inoperative after the driving shaft ceases to reversely rotate the driven shaft, a mechanism connected to the forward drive gears of the driven shaft for automatically releasing said means when said forward drive gears of the driven shaft are driven by a gear on the driving shaft.

8. The arrangement as set forth in claim 1, said mechanism comprising a member connected to said shaft to rotate therewith, a second member normally rotatably connected to said first member and held in fixed position, and spring pressed rollers interposed between said members to permit free rotational movements of one of said members in one direction but preventing reverse rotational movements of the same.

In testimony whereof I affix my signature.

CARL F. RAUEN.